3,264,287
Δ¹-7α-METHYL-5α-ANDROSTENES
Albert Wettstein, Riehen, and Georg Anner, Ludwig Ehmann, and Peter Wieland, Basel, Switzerland, assignors to Ciba Corporation, New York, N.Y., a corporation of Delaware
No Drawing. Filed Mar. 26, 1964, Ser. No. 355,099
Claims priority, application Switzerland, May 6, 1963, 5,675/63
3 Claims. (Cl. 260—239.55)

The present invention relates to the manufacture of new 3-oxygenated Δ¹-7α-methyl-5α-androstenes and 19-norandrostenes of the general formula

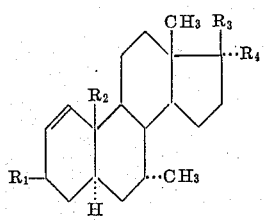

I where $R_1$ and $R_3$ each represents a free, esterified or etherified hydroxyl group, $R_2$ stands for a hydrogen atom or a methyl group, $R_4$ for a hydrogen atom or a saturated or unsaturated, if desired halogenated, lower aliphatic hydrocarbon radical and $R_3$ and $R_4$ together represent a free or protected oxo group.

The new steroids are biologically active compounds and may also be used as intermediates for the manufacture of such products. Thus, the new products of the Formula I, in which $R_3$ stands for a free, esterified or etherified hydroxyl group, display an anabolic and androgenic action.

Those compounds of the above formula which contain in position 17 a hydrocarbon radical, more especially an unsaturated hydrocarbon radical, have also a progestative action.

More especially, there may be mentioned Δ¹-7α-methyl-androstenes of the Formula I in which $R_1$ and $R_3$ each stands for a hydroxyl or acyloxy group and in which the acid radicals are those of aliphatic, alicyclic, araliphatic or heterocyclic carboxylic acids with 1 to 18 carbon atoms and $R_4$ represents a hydrogen atom or an alkyl, alkenyl or alkinyl group with 1 to 4 carbon atoms. The afore-mentioned acid radicals are, for example those of formic, acetic or propionic acid, butyric or valeric (such as n-valeric) acid or trimethylacetic acid, of a caproic acid such as β-trimethylpropionic acid or diethylacetic acid, of oenanthic, caprylic, perlargonic, capric or an undecylic acid, for example undecylenic acid, of lauric, myristic, palmitic or stearic acids, for example of oleic, cylcopropyl-, -butyl-, -pentyl- or -hexyl-carboxylic acid, cyclopropylmethylcarboxylic, cyclobutylmethylcarboxylic, cyclopentylethylcarboxylic, cyclohexylethylcarboxylic acid, a cyclopentyl-, cyclohexyl- or phenylacetic or -propionic acid, of benzoic, phenoxyalkane acids such as phenoxyacetic acid, para-chlorophenoxyacetic acid, 2:4-dichlorophenoxyacetic, 4 - tertiary butyl phenoxyacetic, 3 - phenoxypropionic, 4-phenoxybutyric, furan-2-carboxylic, 5-tertiary butyl furan-2-carboxylic, 5-bromo-furan-2-carboxylic acid, of nicotinic acids, of β-ketocarboxylic acids, for example of acetoacetic, propionylacetic, butyrylacetic or caprinoylacetic acid, of aminoacids such as diethylaminoacetic acid, aspartic acid and the like. Instead of carboxylic acid residues there may be present those of sulphonic acids, also of phosphoric, sulphuric or hydrohalic acids.

As examples of the said lower aliphatic hydrocarbon radicals there may be mentioned alkyl, alkenyl or alkinyl groups, such as a methyl, ethyl, isopropyl, vinyl, allyl, methallyl, ethinyl or propinyl group, or corresponding halogenated groups, for example the trifluoropropinyl group.

The compounds mentioned above can be used as intermediates for example for the manufacture of the corresponding, highly active Δ¹-3-oxo-7α-methylandrostenes described in applicant's patent application, Serial No. 355,-093, filed March 26, 1964. Of special value in this connection are those compounds of the Formula I in which $R_4$ stands for an unsaturated hydrocarbon radical, being for example a vinyl, allyl or ethinyl group. The conversion of the 3-hydroxyl group into an oxo group follows the procedure disclosed in the above-mentioned patent application, for example by way of an Oppenauer oxidation.

The new compounds can be manufactured by known methods. Thus, for example, in a 3-oxo compound corresponding to Formula I the 3-oxo group may be reduced in known manner to a hydroxyl group; if desired, a protected 17-oxo group present is liberated and converted in known manner, if desired with simultaneous introduction of a lower aliphatic hydrocarbon radical in position 17α, into a β-positioned hydroxyl group, and/or a hydroxyl group present, likewise in known manner, can be esterified or etherified, or esterified or etherified hydroxyl groups can be liberated.

The reduction according to the invention of the 3-oxo group is preferably carried out by treatment with a complex-light-metal hydride of the type of the alkali metal or alkaline earth-metal aluminum- or borohydrides, such as sodium, lithium or potassium aluminum or borohydride. Particularly suitable are trialkoxy-lithium-aluminum hydrides, such as tri-tertiary butoxy lithium-aluminum hydride. The reduction with a compound of the type of sodium borohydride is preferably conducted in a lower aliphatic alcohol, such as methanol, ethanol or propanol, if desired with addition of water or, for example pyridine, as solvent. On the other hand, when a complex lithium aluminum hydride is used, it is of advantage to use an inert solvent, such as an ether, for example diethyl ether, tetrahydrofuran or dioxane, or a hydrocarbon, more especially an aromatic hydrocarbon such as benzene, toluene or xylene.

The liberation according to the invention of a protected oxo group which may be present in position 17, for example a ketal or enolether grouping, is preferably performed by treatment with a dilute acid, for example by heating with dilute acetic acid, or by reaction with an alkanone, such as acetone, in the presence of an acidic catalyst, such as paratoluenesulphonic acid.

The 17-oxo group can be converted into a 17-hydroxyl group with the aid of the afore-mentioned complex light-metal hydrides, or by treatment with an organo-metal compound, for example a Grignard compound or an alkali or alkaline earth metal alkyl, alkenyl or alkinyl compound, while at the same time introducing the corresponding hydrocarbon radicals in position 17α, such, for example, as a methyl, ethyl, vinyl, allyl, methallyl, ethinyl, propinyl group or the like.

The acylation or etherification according to the present process of the free hydroxyl groups present is performed in the known manner, for example in the case of acylation by reaction with acid halides or anhydrides of the corresponding acids, preferably in the presence of a base, such as pyridine, or in the case of etherification by treatment with a reactive, esterified lower alkanol, cycloalkanol or aralkanol, such as their hydrohalic or sulfonic acid esters, in the presence of a base, such as a bicarbonate, carbonate or hydroxide of an alkali metal. The optional liberation of esterified or etherified hydroxyl groups is likewise carried out in the usual manner.

As specific compounds coming within the scope of the present invention the following may be especially mentioned:

$\Delta^1$-3β,17β-dihydroxy-7α, 17α-dimethyl-5α-androstene,
$\Delta^1$-3β,17β-dihydroxy-7α-methyl-5α-androstene,
$\Delta^1$-3β-hydroxy-7α-methyl-17-oxo-5α-androstene,
$\Delta^1$-3β,17β-dihydroxy-7α-methyl-17α-ethinyl-5α-androstene and their 3-mono or 17-monoesters or 3,17-diesters, especially the acetates, the valerates, propionates and phenylpropionates, the caproates and undecenoates and the 19-nor derivatives corresponding to all these compounds.

The invention includes also any modification of the process in which an intermediate obtained at any stage of the process is used as starting material and any remaining steps are performed, or the process is discontinued at any stage thereof, or in which a starting material is formed under the reaction conditions or is used in the form of a hydrate or salt thereof.

The $\Delta^1$-3-oxo-7α-methylsteroids used as starting materials for the manufacture according to the invention of the new products of the Formula I, are advantageously prepared as described in applicant's patent application, Serial No. 355,093, filed March 26, 1964, mentioned above, in known manner, for example by introducing the $\Delta^1$-double bond into a corresponding 1:2-saturated 3-oxo-7α-methylsteroid which latter is itself obtained from $\Delta^4$-3-oxo-7α-methyl compounds (which are either known or can be prepared by known methods) by saturation of the $\Delta^4$-double bond, for example by treatment with lithium in liquid ammonia.

The present invention includes also mixtures for use in human or veterinary medicine which contain the said $\Delta^1$ - 3 - hydroxy - 7α-methylandrostenes or -19-nor-androstenes in conjunction or admixture with a solid or liquid pharmaceutical excipient. The mixtures are prepared in the conventional manner, for example with the use of organic or inorganic pharmaceutical excipients suitable for parenteral, enteral or local administration. Suitable excipients are substances that do not react with the products of the present process, for example water, vegetable oils, benzyl alcohols, polyethylene-glycols, gelatine, lactose, starches, magnesium stearate, talcum, white petroleum jelly, cholesterol or other medicinal excipients. There are manufactured more especially preparations for parenteral administration, preferably solutions, above all oily or aqueous solutions, or suspensions, emulsions or depot preparations; for enteral administration there are further manufactured tablets or dragees and for local application also ointments or creams. The preparations may be sterilized or they may contain assistants, such as preserving, stabilizing, wetting or emulsifying agents, salts for regulating the osmotic pressure, or buffers. The content of the active substance in these preparations per unit dose, such as of a tablet, is preferably, 0.1–50 mg. or 0.03–60%.

The following examples illustrate the invention.

EXAMPLE 1

A solution of 6.0 g. of $\Delta^1$-3-oxo-7α:17α-dimethyl-17β-hydroxy-5α-androstene in 250 ml. of ether is slowly stirred into an ice-cooled suspension of 6.0 g. of lithium-aluminum hydride in 180 ml. of ether. The reaction mixture is then stirred for 3 hours at room temperature, after which $\Delta^1$-3-ketone can no longer be detected by a staining test in ultraviolet light. The excess of lithium-aluminium hydride is then decomposed by gradually adding ice-water, whereupon the batch is acidified with dilute hydrochloric acid. The ethereal phase is separated, and the aqueous phase is repeatedly extracted with ether. The combined ethereal extracts are successively washed with dilute hydrochloric acid, dilute sodium carbonate solution and water, then dried over sodium sulfate and concentrated until crystallization sets in. The resulting $\Delta^1$-3β:17β-dihydroxy-7α:17α-dimethyl-5α-androstene melts at 201–205° C.

EXAMPLE 2

A solution of 15.0 g. of $\Delta^1$-3-oxo-7α-methyl-17β-hydroxy-5α-androstene in 150 ml. of ethyl acetate is stirred into a mixture of 5 g. of sodium borohydride and 300 ml. of ethyl acetate while cooling with ice-water. 36 ml. of methanol are then run in within 15 to 20 minutes, and the batch is stirred for another 60 minutes at room temperature, after which no $\Delta^1$-3-ketone can be detected in a specimen in ultraviolet light. A mixture of 20 ml. of glacial acetic acid and 360 ml. of ethyl acetate is then run in to establish a pH value of 7, whereupon the whole is diluted with 1 liter of ethyl acetate. The ethyl acetate solution is repeatedly washed with water, dried over sodium sulfate, filtered until it is clear, and concentrated until crystallization sets in, to yield $\Delta^1$-3β:17β-dihydroxy-7α-methyl-5α-androstene melting at 146–149° C.

EXAMPLE 3

A stirred solution of tri-tertiary butoxy lithium-aluminum hydride (prepared from 500 mg. of lithium aluminum hydride and a mixture of 3 ml. of tertiary butanol in tetrahydrofuran) in 50 ml. of tetrahydrofuran is mixed with a solution of 1.0 g. of $\Delta^1$-3-oxo-7α-methyl-17-ethylenedioxy-15α-androstene in 60 ml. of tetrahydrofuran, and the resulting mixture is refluxed for 3 hours. Conventional working up furnishes 925 mg. of crude $\Delta^1$-3β-hydroxy-7α-methyl-17-ethylenedioxy-5α-androstene which is dissolved, without first having been purified, in 15 ml. of acetone, mixed with 100 mg. of para-toluenesulfonic acid and left to itself for 15 hours at 20° C. The reaction product is then isolated by diluting the mixture with water, extraction with methylene chloride and evaporation of the organic layer after washing it neutral and drying it. The yield of crude $\Delta^1$-3β-hydroxy-7α-methyl-17-oxo-5α-androstene is 86%; in the ultraviolet spectrum it displays no selective absorption above 220 mμ, and its infrared spectrum contains bands, inter alia, at 2.76, 5.75 and 10.10μ. By acetylation for 10 hours with acetic anhydride and pyridine the resulting hydroxy compound is converted into the corresponding acetate, namely $\Delta^1$-3β-acetoxy-7α-methyl-17-oxo-5α-androstene which, after having been purified by chromatography on anhydrous silica gel, displays in the infrared spectrum bands, inter alia, at 5.76 (broad), 8.08, 9.73 and 10.60μ.

EXAMPLE 4

A solution of 500 mg. of the crude $\Delta^1$-3β-hydroxy-7α-methyl-17-oxo-5α-androstene described in Example 3 in 100 ml. of ether and 10 ml. of toluene is cooled to 0° C., saturated with acetylene, mixed while being cooled dropwise with 15 ml. of a 1.8 N-solution of sodium tertiary amylate in teritary amyl alcohol+toluene, whereupon a weak current of acetylene is passed through for 15 hours at 0 to 3° C. The reaction mixture is then poured into 100 ml. of a solution, cooled to −5° C., of ammonium chloride of 20% strength and worked up in the usual manner, to yield 505 mg. of crude $\Delta^1$-3β,17β-dihydroxy-7α-methyl-17α-ethinyl-5α-androstene which, on being heated with acetic anhydride+pyridine, is converted into $\Delta^1$ - 3β:17β - diacetoxy - 7α - methyl - 17α - ethinyl-5α-androstene. The latter compound can be advantageously purified by chromatography on silica gel.

EXAMPLE 5

A solution of 2.5 g. of $\Delta^1$-3-oxo-7α,17α-dimethyl-17β-hydroxy-19-nor-5α-androstene in 40 ml. of anhydrous tetrahydrofuran is poured while stirring and cooling with ice under nitrogen into a mixture of 1.5 g. of lithium aluminum hydride in 250 ml. of ether, the flask containing the solution being rinsed with 40 ml. of tetrahydrofuran. The mixture is stirred for five hours at room temperature and then there are added consecutively, while cooling with an ice-methanol mixture, 10 ml. of ethyl acetate, 20 ml. of benzene and then a saturated Rochelle salt solution and water. The aqueous layer is extracted twice with ether, the organic solution is washed with Rochelle salt solution and water, dried and evaporated under reduced pressure after methylene-chloride has been added. By recrystallizing the residue from a mixture of methylene-chloride and ether there are obtained 1.96 g. of $\Delta^1$-3$\beta$,17$\beta$-dihydroxy-7$\alpha$,17$\alpha$-dimethyl-19-nor-5$\alpha$-androstene. When this product is recrystallized further from a mixture of ethyl acetate and hexane it melts at 187.5–189° C. Its infra-red spectrum taken in methylene chloride shows bands, inter alia, at 2.73, and 2.83$\mu$ (hydroxyl) 7.20, 7.25, 9.32, 9.50, 9.74, 10.72 and 11.77$\mu$.

EXAMPLE 6

The following pharmaceutical preparations are made in a manner known per se:

*1000 tablets for oral administration containing 1 mg. of $\Delta^1$-3$\beta$,17$\beta$ - dihydroxy - 7$\alpha$,17$\alpha$ - dimethyl - 19 - nor - 5$\alpha$-androstene*

| Ingredients: | G. |
|---|---|
| $\Delta^1$ - 3$\beta$,17$\beta$ - dihydroxy - 7$\alpha$,17$\alpha$ - dimethyl-19-nor-5$\alpha$-androstene | 1.00 |
| Lactose | 53.00 |
| Gelatine | 1.00 |
| Wheat starch | 39.50 |
| Magnesium stearate | 0.30 |
| Talc | 5.20 |
| | 100.00 |

Procedure: The mixture of the active ingredient, lactose and wheat starch is moistened with a gelatine solution of 10% strength to form a slightly plastic mass and then granulated in the usual manner. After being dried at 40° C., the mass is brought into the usual grain size by being passed through a sieve. Magnesium stearate and talc are added to the dried mass and the mixture is then compressed into tablets of 7 mm. in diameter.

*1000 tablets for oral administration containing 5 mg. of $\Delta^1$ - 3$\beta$,17$\beta$ - dihydroxy - 7$\alpha$ - methyl - 17$\alpha$ - ethinyl-5$\alpha$-androstene*

| | G. |
|---|---|
| $\Delta^1$ - 3$\beta$,17$\beta$ - dihydroxy - 7$\alpha$ - methyl - 17$\alpha$-ethinyl - 5$\alpha$ - androstene | 5.00 |
| Lactose | 70.00 |
| Gelatine | 3.00 |
| Wheat starch | 40.00 |
| Arrowroot | 15.00 |
| Magnesium stearate | 0.7 |
| Talc | 6.3 |
| | 140.00 |

The procedure for making the preparation is analogous to that described above.

*100 oil ampoules each containing 10 mg./ml. of 3$\beta$-undecenoate of $\Delta^1$ - 3$\beta$,17$\beta$ - dihydroxy - 7$\alpha$,17$\alpha$ - dimethyl 5$\alpha$-androstene*

Ingredients:
| | | |
|---|---|---|
| The above active compound | g | 1 |
| Benzyl alcohol | ml | 10 |
| Sesame oil | ml | 90 |

The active ingredient is dissolved in pure benzyl alcohol and the stirred solution diluted with hot sterilized sesame oil. 1 ml. of this solution containing the ingredients in the above amounts is filled in ampoules which are sterilized at 160° C. for 1.5 hours.

What is claimed is:
1. $\Delta^1$ - 3$\beta$ - hydroxy - 7$\alpha$ - methyl - 17 - oxo - 5$\alpha$-androstene.
2. $\Delta^1$ - 3$\beta$ - acetoxy - 7$\alpha$ - methyl - 17 - oxo - 5$\alpha$-androstene.
3. $\Delta^1$ - 3$\beta$ - hydroxy - 7$\alpha$ - methyl - 17 - ethylenedioxy-5$\alpha$-androstene.

References Cited by the Examiner
UNITED STATES PATENTS
3,002,005   9/1961   Campbell et al.   260—397.3
3,031,473   4/1962   Colton   260—397.5

FOREIGN PATENTS
1,079,040   4/1960   Germany.

OTHER REFERENCES
Campbell et al.: "Steroids," vol. 1, No. 3, March 1963, pp. 317–24.

LEWIS GOTTS, *Primary Examiner.*

HENRY R. FRENCH, *Assistant Examiner.*